United States Patent

Krakow et al.

[15] 3,698,622

[45] Oct. 17, 1972

[54] METHOD AND DEVICE FOR SUPPLYING A BAND MADE OF SHEET METAL PLATES TO A SPIRAL WELDED TUBE MILL

[72] Inventors: Heinz Krakow; Carl Niedorf, both of Hamburg, Germany

[73] Assignee: Blohm & Voss AG, Hamburg-Steinwerder, Germany

[22] Filed: April 6, 1971

[21] Appl. No.: 131,737

[52] U.S. Cl. ..........................228/5, 29/477, 219/62, 228/4, 228/25, 228/26
[51] Int. Cl. ................................................B23k 1/20
[58] Field of Search..........219/62, 60 R; 228/25, 5, 6, 228/26, 4, 15; 29/477, 477.3

[56] References Cited

UNITED STATES PATENTS

| | | | |
|---|---|---|---|
| 2,533,605 | 12/1950 | Mueller | 228/26 X |
| 3,423,003 | 1/1969 | Fletcher | 228/15 |
| 3,497,943 | 3/1970 | Niederstrasser et al. | 29/477 |
| 3,647,130 | 3/1972 | Hahne | 228/5 |
| 3,647,131 | 3/1972 | Hahne | 228/5 |

Primary Examiner—John F. Campbell
Assistant Examiner—Richard Bernard Lazarus
Attorney—Singer, Stern & Carlberg

[57] ABSTRACT

The method and device of the invention provide for supplying sheet metal plates of substantial thickness to the deformation device of a spiral welded tube mill and comprises the intermittent feeding of individual sheet metal plates to a pre-fabrication device which is arranged ahead of a conventional spiral weld tube mill. In this prefabrication device, the individual sheet metal plates are first welded together to form double length plates which then are connected by welding to a previously completed band comprising serially connected double length sheet metal plates whose longitudinal edges are trimmed and chamfered before being conveyed into the deformation device which forms the band into a tube and unites the abutting longitudinal edges to form a spiral weld.

5 Claims, 2 Drawing Figures

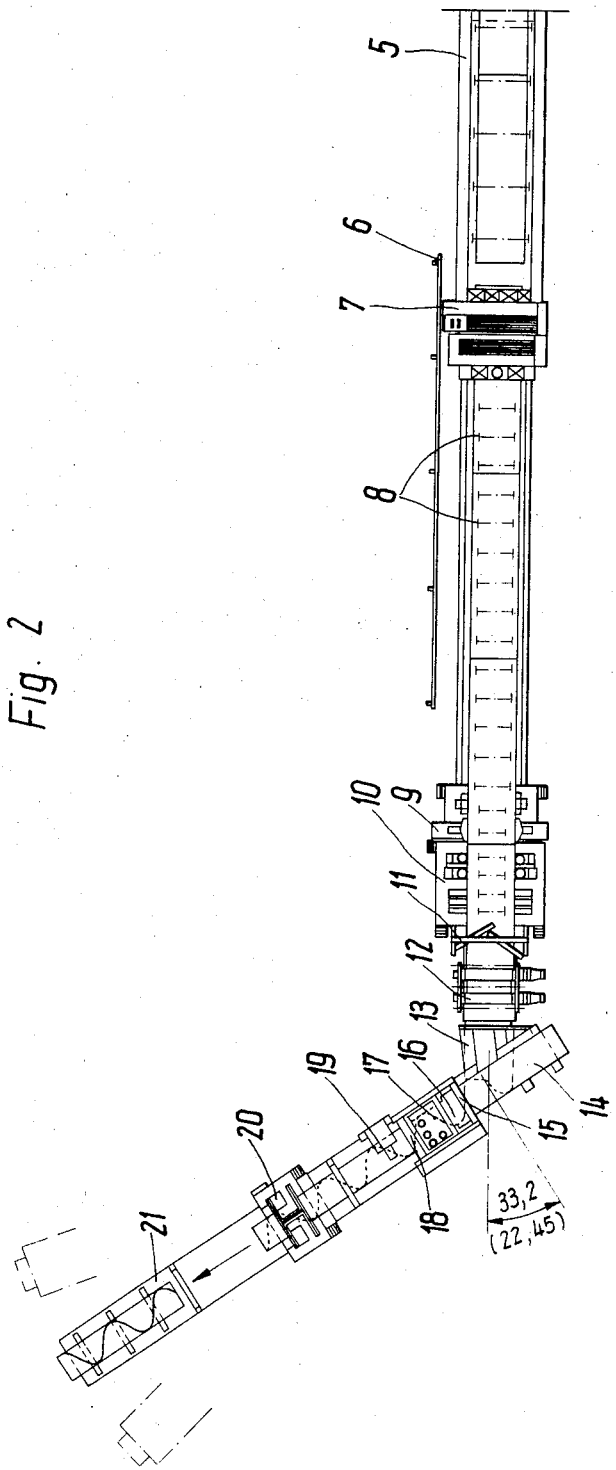

METHOD AND DEVICE FOR SUPPLYING A BAND MADE OF SHEET METAL PLATES TO A SPIRAL WELDED TUBE MILL

The invention relates to a method and a device for the supplying of a band-shaped material, for example, sheet steel, to the deformation station of a spiral-seam tube or spiral welded tube in which individual sheet-metal plates are supplied intermittently and are welded together to a continuous band.

The difficulties in the production of spiral welded tubes increase with increasing wall thickness and with increasing diameter of the tube. Thus, for example, thicker sheet-metal plates can no longer be supplied in the form of a so-called "coil," but must be obtained in the form of individual flat sheet-metal plates. It is already known to produce spiral welded tubes from flat sheet-metal plates, in which one sheet-metal plate is welded continuously and transversely to the direction of the band, to the other sheet metal plate. The sheet-metal band which is produced in this manner continuously, preferably upon traveling drive rollers is moved continuously into the deforming machine. The production of a transverse connection between two sheet-metal plates, in the following designated as butt joint requires an alinement, a clamping, the production of a welding channel, a welding procedure, and finally a relaxing or release of the sheet-metal plates from the clamping. For these individual method steps in the production of such a butt joint with a newly supplied sheet-metal plate with the band already run into the deformation station, in each case a time period is available which is determined by the length of each of the newly arriving sheet-metal plates divided by the speed of advance. During this time period, the newly arriving sheet-metal plate, while the latter moves with band speed, but at a slight distance from the rear edge of the band already traveling into the deformation machine, must be alined with respect to the band, must be clamped, chamfered, welded and then released again from the clamping.

Devices for producing such a butt-joint are known, but they fail when an attempt is being made to use greater thicknesses of sheet metal for the reason that when sheet metal thicknesses are above 20 mm., the cross-section to be worked upon and to be filled with welding material in the form of a one-sided V and the width of the sheet-metal (for example 4 m) increase in relation to the length of the sheet metal (approximately 15 m), in such manner, that the longer period of time required for the completion of a butt-joint is solely attainable by means of decreasing the speed of advance. This measure adds to the cost of the hourly yield of the machine, and accordingly also adds to the cost of its productiveness and is therefore undesirable.

On the other hand, with large sheet-metal thicknesses the length-dimensions cannot be increased up to the slab-ingot weight and the perhaps possible dimensions of the roller train, because then the required tolerances for the production of spiral welded tubes with reference to the non-angularity, sheet-metal-thickness and swordlike quality of the material can no longer be maintained.

It was now discovered that this problem, in a method for the supplying of a band-shaped material, for example, sheet steel, to the deformation station of a spiral welded tube mill, to which individual sheet-metal plates are intermittently supplied and welded together into a continuous band, can be solved in accordance with the invention, in that the sheet-metal plates first are conveyed through a pre-fabrication station in which the sheet-metal plates are connected in series and then are supplied to the band already running into the deformation station in proper time.

In contrast to the known methods in which sheet-metal plates, as soon as they leave the rolling mill, are connected in a spiral welded tube mill continuously with the band already introduced into the deformation station, the present invention provides that the sheet-metal plates are first passed through a pre-fabrication station which consists essentially in the performance of pre-working steps, which improve the production of the welded joint on the running band and make this work possible within the time period available during the normal speed of advance. The pre-fabrication may take place separately from the deformation station and may be constructed one way or multiple way, in case the space conditions do not permit of a direct, possibly single way pre-fabrication connected directly with the deformation station. This preparatory work may, for example, consist in the pre-fabrication of the chamfering on all abutting edges of all the individual sheet-metal plates.

The pre-fabrication may, however, also consist in this, that the length of each sheet-metal which is continuously to be connected with the band running already into the deformation station, will be increased in that, already in the pre-fabrication, in each case two individual sheet-metal plates are permanently connected with one another at their abutting edges lying opposite one another, so that double length sheet metal plates having the desired tolerance are available. The pre-fabrication may also consist in a combination of both possibilities described in the foregoing.

It may also be of advantage to connect during the pre-fabrication after the chamfering operation all or individual butt edges of the individual sheet-metal plates, or in each case only two or more by a tack-welding operation. The advantage would be that only one single alining step is required.

The chamfering operation may also be subdivided in that, for example, only the trimming of the normal surfaces of the butt edges for the butt joints takes place in the pre-fabrication. This measure produces a very uneven, partially very strong and therefore a very time-consuming material treatment at the transverse edges, and therewith an alinement of the sheet-metal plates on the basis of the extent of the longitudinal edges, at which then a correspondingly smaller material working is required.

All these mentioned possibilities come under the pre-fabrication, and the type and extent of the pre-fabrication is to be determined according to the type of sheet metal material, the dimensions of the same and their tolerances as well as the feeding speed and the cross-section of the welding joint.

In the present case, the combination mentioned in the foregoing is to be preferred, according to which the pre-fabrication consists therein, that in each case two individual sheet-metal plates are connected to form a sheet metal plate of double length and whose front and rear butt edges are chamfered, because then the connecting operation with the band already traveling into the deformation station is timely appreciably relieved and because the devices employed during this pre-fabrication stage are well equalized.

Furthermore, the working steps required during the pre-fabrication may be varied. The chamfering and welding of the butt edges may for example take place jointly, that is, in one and the same device consecutively, which has the advantage of requiring only a single clamping operation.

The processing in the pre-fabrication stage may, however, also be carried out in separate processing devices, that is, in one processing device the chamfering takes place and in another processing device, which is separated from the first one mentioned, the welding of the butt edges of the individual sheet-metal places is accomplished.

This has the advantage, that both processing devices may operate at the same time. Furthermore, one or also two pre-fabrication lines for each deformation-station may be provided and the processing devices may be stationary or also movable within these pre-fabrication lines.

If a sufficient length is available for the installation, the one-way pre-fabrication line in the direction of the band running into the deformation station with stationary processing devices may be the most easily supervisable and may be least expensive.

The device for carrying out the previously described method in a one-way pre-fabrication line may in further development of the invention, consist in, that for the transportation of the sheet-metal plates, a motor-driven roller bed is employed and for the processing in the pre-fabrication line a first stationary processing device for the chamfering of the butt edges. A second stationary processing device serves for the connection of two individual sheet-metal plates to a double length sheet metal, while a third movable processing device is used for the connection of the double length sheet metal plate with the already finished band. A fourth stationary processing device is employed for the trimming and chamfering of the band edges, and a driving apparatus with two pairs of rolls is used for the transportation of the band and finally a deformation station, is employed.

In such a device, the working methods would consist in that the individual sheet-metal plates are first transported to a production line and in each case two individual sheet-metal plates are clamped in a first stationary processing device a determined distance apart at their oppositely disposed butt edges, are chamfered at these edges and then released and conveyed a distance equal to an individual plate length, and that then the second plate is clamped anew with the next following third plate and chamfered at the butt edges now lying opposite one another, and then is released again, whereby the first and the second plate are transported to a second stationary processing device and there clamped anew, welded to one another and then again released, so that now the sheet metal thus formed has a double length and is again clamped in a portable third processing device provided with an individual drive, together with its rear band edge is welded to the band running already into the deformation station, is then released and therewith separated from the portable third processing device and that then the band with the aid of a four-roller driving apparatus is moved through a fourth processing device, in which the band is trimmed laterally, and then is pressed into the deformation machine.

Within the entire installation, the transportation of the sheets takes place in the range of the stationary processing devices by means of a roller bed provided with motor-driven rollers.

In further development of this entire installation, the first processing device may consist of two operating devices independent of one another, each of which has an arresting means, a hydraulic clamping means, and a milling unit for each one of the transverse edges of the sheet metal plates. Each one of the two milling units is provided with a circumferential milling cutter and operates in each case on a transverse edge of one of the two clamped sheet-metal plates and produces in the edge in one transitory movement, for example, a groove comprising one half of a Y-profile.

The second processing device has likewise two arresting means and two hydraulic clamping means for each of the two butt edges. In addition, a copper rail is urged likewise hydraulically under the welding joint. The welding operation takes place by means of a submerged three-wire-welding-device (or automatic welder). For producing this welding joint on the butt edges, which already previously were chamfered in finished form, the feed time for the length of a double length sheet metal plate is available.

The third processing device is similar in construction to the one used for the welding operation, that is, with respect to the clamping means, the copper rail and the automatic welding means, namely, to that of the second processing device, except that this third treatment device is provided with its own drive. The individual transporting device serves the purpose of returning the treatment device to the starting position after the completion of the welding operation, and then, of speeding up the entire third processing device, when weight is several tons, inclusive that of the double length sheet metal plate in the direction toward the band and of accelerating up to the speed of the band, in order to weld the front edge of the next double length sheet metal plate with the rear edge of the long band already running into the deformation station. As soon as the band speed is attained by means of this drive, this third processing device is clamped automatically to the band grasped by the drive rollers. This arrangement has the advantage, that the forces required for the acceleration of the third processing device cannot influence the band and therefore also not its advance movement. This measure contributes very much to a trouble-free deformation- and welding- operation.

The fourth processing device is mounted stationarily. It has two double milling assemblies. The first of them is arranged rigidly and serves for the trimming, namely, for producing a normal surface. The second milling assembly serves for engaging the lateral edges of the band.

The driving means for conveying the band has two pairs of rollers arranged consecutively, which has substantial advantages, because the high surface pressures required for great thicknesses of sheet-metal plates are difficult to obtain with a single pair of rollers, unless one employs very large roller diameters or which might cause undesirable deformations of the material. The difficulty with two pairs of rollers, however, consists therein, that they have to operate completely synchronously and have to be adjustable parallel to one another, in order to be able to control deviations of the band travel from its desired direction.

Nevertheless, this four-roller-arrangement is very desirable in connection with the method of the present invention.

The invention will now be described in greater detail with reference to the accompanying drawings which illustrate diagrammatically and by way of example one installation of the invention capable of practicing the method of the invention.

In the drawings:

FIG. 2 illustrates diagrammatically the remaining portion or the finishing end of the installation.

Figure 1:
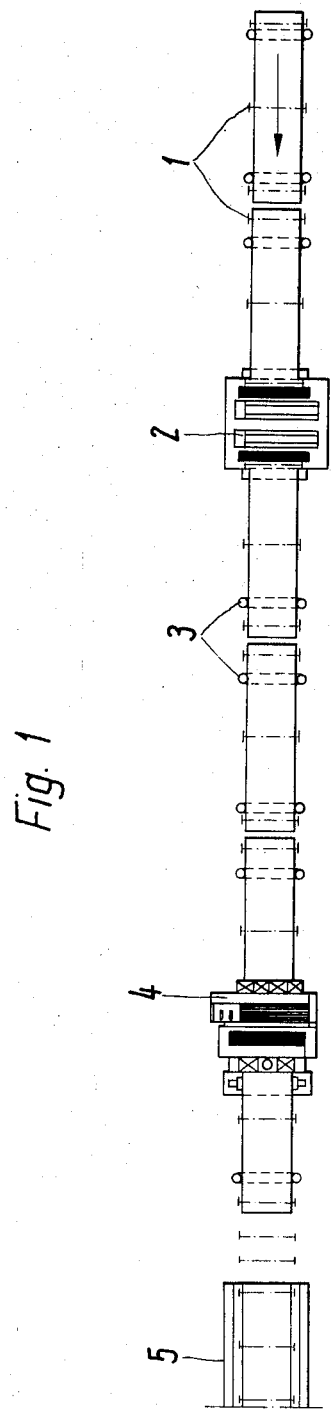
FIG. 1 illustrates diagrammatically the starting end of the installation.

Referring to the drawings, the operating method of the invention starts at the right hand end of FIG. 1, proceeds toward the left hand end of this FIG. 1, continues at the right hand end of FIG. 2 and is completed at the left hand end of this FIG. 2.

At the right hand end of FIG. 1, the sheet metal plates are conveyed in the direction of the arrow by a motor-driven roller bed 1 provided with lateral guide rollers 3 to the pre-fabrication and first reach a first stationary processing device 2, namely a milling station. At this station the transverse edges of all sheet-metal plates are chamfered, that is, here takes place the necessary preparation of the edges of the sheet-metal plates for the reception of the welding material, namely, the trimming and the finishing of the welding channel. Then the individual sheet-metal plates are conveyed to a second stationary processing device 4 comprising a first welding station, where each two individual sheet metal plates are united to form a double length- sheet metal plate which by means of conveyor car 5 is moved to a third mobile processing device 7, comprising another welding station whose supply of electric energy is furnished by a trailing conductor device 6. While the double length- sheet metal plate is connected with the rear end of a band comprises previously united double length sheet metal plates which already traveling in the deformation station, the band comprising united double length sheet metal plates rests on folding blocks 8, whose folding-links during the travel to and fro of the third processing device 7 deflect the blocks 8 and thus permit a passing of the mobile third processing device 7. Subsequently the band passes the side guide members 9 and then the edges of the band are worked upon. This takes place in a fourth processing device 10, namely, in another milling station. Here the longitudinal edges of the band are trimmed and chamfered, and then the band is practically ready for the introduction into the deformation station 14. It passes, however, first the rotating brushes 11 for the purpose of cleaning, and then the band by means of a drive apparatus 12 reaches the band inlet-guide 13 which introduces it into the tube forming station 14, in which the band is formed into a tube and is welded along its longitudinal edges. An inner welding station is designated by 15 and a further milling station is designated by 16. The connection of the longitudinal edges of the band is then completedby means of an outer welding station 17 and a second inner welding station 18, and in a test device 19 is examined. A tube separating car 20 then cuts off the desired tube lengths, which then are lowered at 21 and moved away.

The devices behind the drive apparatus 12 do not form a part of the present invention, but are described only for explaining the entire course of the method.

The method according to the invention, and the device provided therefor permits the manufacturing of tubes of great diameter from abnormally thick sheet-metal plates with a speed which corresponds to the speed employed when processing thinner sheet metal plates. The individual parts of the installation may all be controlled in accordance with a selectable program. The same holds true for the removal of the cuttings, the cooling and lubrication, so that the entire installation with a length of over 100 m. requires practically no manual work and only a few supervisory persons.

At the left hand end of FIG. 2 is indicated by dash and dotted lines that the deformation station 14 with the associated welding stations and tube separating car may be horizontally pivotally displaced relatively to the processing device 10 and the drive apparatus 12 about different angles, such as 22.45° and 33.2°.

What we claim is:

1. Device for supplying a band-shaped material, for example made of sheet steel, to the deformation station of a spiral welded tube mill, comprising means forming a pre-fabrication station arranged ahead of said spiral welded tube mill, a first stationary processing means (2) at said pre-fabrication station for chamfering the abutting edges of sheet metal plates which are arranged serially and conveyed to said first processing means by a motor-driven roller train (1), a second stationary processing means (4) for the connection of two individual sheet-metal plates to form a double length sheet metal plate, a third movable processing means (7) for the connection of the double length sheet metal plates with a previously completed band, comprising serially united sheet metal plates, a fourth stationary processing means (10) for trimming and chamfering the longitudinal edges of said band and a driving means (12) provided with two pairs of rollers for the conveyance of the band, toward said deformation station (14).

2. Device according to claim 1, in which said first processing means (2) comprises two operating devices which are independent of one another, each of which are provided with a sheet metal plate arresting means, a hydraulic clamping means and a milling means for each transverse edge of said sheet metal plates.

3. Device according to claim 1, in which said second processing means (4) comprises two arresting and clamping means for each of the two butt edges of two serially disposed sheet-metal plates to be joined, as well as a copper rail and a submerged three-wire-automatic welder.

4. Device according to claim 1, in which said third processing means (7) comprises the same arresting and clamping means as said second device, and an individual drive therefor.

5. Device according to claim 1, in which said fourth processing means (10) is mounted stationarily and comprises two double-milling-assemblies for the trimming and chamfering of the edges of said band.

* * * * *